US011225108B2

(12) United States Patent
Nakajima (10) Patent No.: US 11,225,108 B2
(45) Date of Patent: Jan. 18, 2022

(54) TIRE

(71) Applicant: BRIDGESTONE CORPORATION, Tokyo (JP)

(72) Inventor: Daisuke Nakajima, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 159 days.

(21) Appl. No.: 16/677,961

(22) Filed: Nov. 8, 2019

(65) Prior Publication Data

US 2020/0070576 A1    Mar. 5, 2020

Related U.S. Application Data (63) Continuation of application No. PCT/JP2017/045597, filed on Dec. 19, 2017.

(51) Int. Cl.

| | |
|---|---|
| *B60C 1/00* | (2006.01) |
| *C08J 7/12* | (2006.01) |
| *C08K 5/00* | (2006.01) |
| *C08K 5/435* | (2006.01) |
| *C08L 23/04* | (2006.01) |
| *C08L 23/10* | (2006.01) |
| *C08L 23/22* | (2006.01) |
| *C08L 25/08* | (2006.01) |
| *C08L 33/08* | (2006.01) |
| *C08L 35/00* | (2006.01) |
| *C08L 51/04* | (2006.01) |
| *C08L 51/06* | (2006.01) |
| *C08L 77/06* | (2006.01) |
| *C08L 21/00* | (2006.01) |
| *C08L 23/08* | (2006.01) |

(52) U.S. Cl.
CPC ........ *B60C 1/00* (2013.01); *C08J 7/12* (2013.01); *C08K 5/0016* (2013.01); *C08K 5/435* (2013.01); *C08L 21/00* (2013.01); *C08L 23/04* (2013.01); *C08L 23/0815* (2013.01); *C08L 23/10* (2013.01); *C08L 23/22* (2013.01); *C08L 25/08* (2013.01); *C08L 33/08* (2013.01); *C08L 35/00* (2013.01); *C08L 51/04* (2013.01); *C08L 51/06* (2013.01); *C08L 77/06* (2013.01)

(58) Field of Classification Search
CPC .... B60C 1/00; B60C 7/18; B60C 7/00; B60C 2007/005; C08L 25/08; C08L 35/00; C08L 23/22; C08L 51/04; C08L 21/00; C08L 23/04; C08L 51/06; C08L 23/10; C08L 33/08; C08L 77/06; C08L 23/0815; C08G 69/26; C08K 5/0016; C08K 5/435; C08J 7/12

See application file for complete search history.

(56) References Cited

U.S. PATENT DOCUMENTS

| | | | | |
|---|---|---|---|---|
| 5,602,200 | A * | 2/1997 | Wissmann | ............ C08L 77/00 525/66 |
| 5,874,176 | A * | 2/1999 | Kamei | .................. C08L 51/06 428/474.4 |
| 8,378,035 | B2 | 2/2013 | Kawaguchi et al. | |
| 10,011,146 | B2 | 7/2018 | Fudemoto et al. | |
| 10,273,360 | B2 | 4/2019 | Mizumoto et al. | |
| 2008/0255310 | A1 | 10/2008 | Tsou et al. | |
| 2008/0314493 | A1 | 12/2008 | Hara | |
| 2010/0036028 | A1 | 2/2010 | Morooka | |
| 2010/0099821 | A1 | 4/2010 | Soeda et al. | |
| 2010/0112257 | A1 | 5/2010 | Morooka | |
| 2013/0206301 | A1 * | 8/2013 | Fudemoto | ............... B60C 9/04 152/450 |
| 2014/0251518 | A1 * | 9/2014 | Abe | ....................... B60B 9/04 152/75 |
| 2017/0120681 | A1 | 5/2017 | Toyosawa | |
| 2019/0023074 | A1 | 1/2019 | Nakajima | |
| 2019/0048178 | A1 | 2/2019 | Chino et al. | |

FOREIGN PATENT DOCUMENTS

| | | |
|---|---|---|
| CN | 101643579 A | 2/2010 |
| CN | 101993577 A | 3/2011 |
| CN | 103997927 A | 8/2014 |
| CN | 104292622 A | 1/2015 |
| CN | 104804659 A | 7/2015 |
| CN | 106660395 A | 5/2017 |
| EP | 2154202 A2 | 2/2010 |
| EP | 2290003 A2 | 3/2011 |
| EP | 3156257 A1 | 4/2017 |
| JP | 06116461 A | 4/1994 |

(Continued)

OTHER PUBLICATIONS

Bishnu P. Panda et al., "Mechanism of Toughening in Rubber Toughened Polyolefin—A Review", Polymer-Plastics Technology and Engineering, 2015, vol. 54, Issue 5, 1-35 (35 pages total).

(Continued)

*Primary Examiner* — Angela C Scott (74) *Attorney, Agent, or Firm* — Sughrue Mion, PLLC (57) ABSTRACT

An object of the present disclosure is to provide a highly durable tire using a resin composition, and a solution to the problem is a tire obtained by using a resin composition containing a polyamide resin and an elastomer having a glass transition temperature of 25° C. or less, wherein the melt viscosity ν (Pa·sec) at 240° C. and the average distance between elastomer interfaces, τ (µm), satisfy the relationship of the following expression (1):

$$\nu < 34.369 \tau^{-3.525} \quad (1).$$

18 Claims, 5 Drawing Sheets

(56) References Cited

FOREIGN PATENT DOCUMENTS

| JP | 8-259741 | A | 10/1996 |
|---|---|---|---|
| JP | 10-16137 | A | 1/1998 |
| JP | 2000-063572 | A | 2/2000 |
| JP | 2002-080644 | A | 3/2002 |
| JP | 2009-513772 | A | 4/2009 |
| JP | 2010-036883 | A | 2/2010 |
| JP | 2010-037465 | A | 2/2010 |
| JP | 2010037496 | A | 2/2010 |
| JP | 2010-516835 | A | 5/2010 |
| JP | 2010-132850 | A | 6/2010 |
| JP | 2014-166825 | A | 9/2014 |
| JP | 2015-155303 | A | 8/2015 |
| JP | 2016-029159 | A | 3/2016 |
| JP | 2018-086864 | A | 6/2018 |
| WO | 2007/100157 | A | 9/2007 |
| WO | 2017047274 | A1 | 3/2017 |
| WO | 2017/131212 | A1 | 8/2017 |

OTHER PUBLICATIONS

Extended European Search Report (EESR) dated Oct. 30, 2020 issued by the European Patent Office in Application No. 17909168.1.

Takayuki Fukui et al., "Elastic-Plastic Analysis of Rubber-Toughened Nylon by Two-Dimensional Finite Element Method", Apr. 1990, pp. 315-320, vol. 47, No. 4.

International Search Report for PCT/JP2017/045597 dated Mar. 20, 2018 [PCT/ISA/210].

International Preliminary Report on Patentability dated Nov. 12, 2019 in International Application No. PCT/JP2017/045597.

Search Report dated Feb. 8, 2021 by the China National Intellectual Property Administration in application No. 201780090642.7.

* cited by examiner

TIRE

TECHNICAL FIELD

The present disclosure relates to a tire.

BACKGROUND

Polyamide resin is known as a resin excellent in processability, chemical resistance, heat resistance, etc., and these properties are used in various resin products such as injection molded articles, extrusion molded articles, and films.

For example, PTL 1 below discloses a polyamide resin composition including a polyamide resin and a modifying polymer having a functional group reactive with the polyamide resin, and discloses the use of the polyamide resin composition for resin products such as an inner liner or a hose of a pneumatic tire.

In order to avoid the occurrence of a puncture, there has recently been proposed a non-pneumatic tire with a framework member thereof being formed from a resin composition, as a tire that does not need to be internally filled with pressurized air.

CITATION LIST

Patent Literature

PTL 1: JP 2010-516835 A.

SUMMARY

Technical Problem

However, when non-pneumatic tires as described above are attached and used in a vehicle, cracks may occur in the framework member formed of the resin composition due to stone chip damage, curbstone scraping, or the like. Even if such a crack is small, the crack may grow while the tire is running and cause a decrease in durability of the framework member. As a technique for suppressing growth of such cracks, there is a method of kneading an elastomer into a resin and suppressing the growth of cracks with the elastomer. The effect of suppressing the crack growth increases as the dispersibility of the elastomer increases. However, when the dispersibility of the elastomer is improved by a typical technique such as optimizing the kneading conditions of the resin and the elastomer or improving the modification ratio of elastomer, the melt viscosity of the resin composition including the resin and the elastomer is remarkably increased. With such an increase in the melt viscosity of the resin composition, for example, not only is the productivity by injection molding worsened, but the resin composition is not be sufficiently mixed at the junction (weld) of the resin composition flowing through the mold. Consequently, the strength of the framework member thus obtained decreases, leading to a decrease in durability.

Therefore, an object of the present disclosure is to solve the problem of the related art described above and provide a highly durable tire using a resin composition.

Solution to Problem

The main features of the present disclosure for solving the above problem are as follows.

A tire of the present disclosure is obtained by using a resin composition containing a polyamide resin and an elastomer having a glass transition temperature of 25° C. or less, wherein a melt viscosity ν (Pa·sec) at 240° C. and an average distance between elastomer interfaces, τ (μm), satisfy the relationship of the following expression (1):

$$\nu < 34.369 \tau^{-3.525} \tag{1}$$

Such a tire of the present disclosure has high durability.

Here, in the present disclosure, the melt viscosity ν at 240° C. of the resin composition was calculated with the attached software from the measurement result under a load of 2.16 kg using a capillary rheometer CFT-100D manufactured by Shimadzu Corporation.

In the present disclosure, the average distance between elastomer interfaces, τ, in the resin composition was calculated by the following method.

First, three regions of 30 μm×30 μm were confirmed with AFM, and the measured image was processed with ImageJ to determine the average particle diameter of the elastomer. At this time, those having a size 0.09 μm² or less were removed as noise. Thereafter, the distance between interfaces when elastomers having the average particle diameter calculated by the above method were arranged at equal intervals in a region of 30 μm×30 μm was determined and defined as the average distance between elastomer interfaces, τ.

In a preferred example of the tire of the present disclosure, the polyamide resin is a polyamide resin formed by polymerizing an aliphatic diamine having 6 to 20 carbon atoms and an aliphatic dicarboxylic acid having 10 to 20 carbon atoms. In this case, the tire can maintain high durability even if the tire is used in a high-humidity environment.

In another preferred example of the tire of the present disclosure, the elastomer includes at least one selected from the group consisting of polyethylene, polypropylene, ethylene-propylene rubber, ethylene-1-butene copolymer, poly α-olefin, acrylic rubber, and styrene-ethylene-butylene-styrene copolymer. In this case, the durability of the tire can be further improved.

In another preferred example of the tire of the present disclosure, maleic anhydride is copolymerized with or grafted onto at least a portion of the elastomer. In this case, the durability of the tire can be further improved.

In another preferred example of the tire of the present disclosure, an epoxy-terminated acrylic acid ester is copolymerized with or grafted onto at least a portion of the elastomer. In this case as well, the durability of the tire can be further improved.

The resin composition used for the tire of the present disclosure preferably includes 60 to 90% by mass of the polyamide resin, more preferably 65 to 85% by mass, and even more preferably 70 to 80% by mass. In this case, the durability of the tire can be further improved.

In another preferred example of the tire of the present disclosure, 10 to 50% by mass of the elastomer is a modified elastomer and 90 to 50% by mass of the elastomer is an unmodified elastomer. In this case, the durability of the tire can be further improved.

The resin composition used for the tire of the present disclosure preferably further contains 1 to 20% by mass of a plasticizer. In this case, the melt viscosity ν at 240° C. of the resin composition is lowered, and the durability of the tire using the resin composition can be further improved.

Here, it is preferable that the plasticizer include at least one selected from the group consisting of N-butylbenzenesulfonamide, 2-ethylhexyl-4-hydroxybenzoate, and N-(2-hydroxypropyl)benzenesulfonamide. In this case, the durability of the tire can be further improved.

In the resin composition used for the tire of the present disclosure, the elastomer preferably has a melt flow rate (MFR) of 15 g/10 min or more at 230° C. under a load of 2.16 kg. In this case, the average distance between elastomer interfaces, τ, in the resin composition is shortened, and the durability of the tire using the resin composition can be further improved.

In another preferred example of the tire of the present disclosure, 60 to 90% by mass of the polyamide resin is polyamide 610 having a melt flow rate (MFR) under a load of 2.16 kg at 240° C. of 50 g/10 min or less, and 10 to 40% by mass of the polyamide resin is polyamide 610 having a melt flow rate (MFR) under a load of 2.16 kg at 240° C. of 60 g/10 min or more. In this case, the durability of the tire can be further improved.

In the present disclosure, the melt flow rate (MFR) of the elastomer and the polyamide resin is a value measured according to JIS K 7210.

In an embodiment of the present disclosure, the aforementioned tire is a non-pneumatic tire including a wheel portion to be attached to an axle, an inner cylinder externally covering the wheel portion, an outer cylinder surrounding the inner cylinder from an outside in a tire radial direction, a plurality of connecting members arranged along a tire circumferential direction between the inner cylinder and the outer cylinder and connecting the inner cylinder and the outer cylinder to each other, and a tread member provided outside the outer cylinder in the tire radial direction, and the inner cylinder, the outer cylinder, and the connecting members are formed of the resin composition. In this case, a non-pneumatic tire having excellent durability can be obtained.

Advantageous Effect

According to the present disclosure, a highly durable tire using a resin composition can be provided.

DETAILED DESCRIPTION

The tire of the present disclosure will be illustratively described below in detail based on embodiments thereof.

A tire of the present disclosure is obtained by using a resin composition containing a polyamide resin and an elastomer having a glass transition temperature of 25° C. or less, wherein a melt viscosity ν (Pa·sec) at 240° C. and an average distance between elastomer interfaces, τ (μm), satisfy the relationship of the following expression (1):

$$\nu < 34.369\tau^{-3.525} \quad (1)$$

Such a tire of the present disclosure has high durability.

As described above, in order to suppress the growth of cracks in a tire produced using a resin composition including a resin and an elastomer and improve the durability of the tire, it is effective to improve the dispersibility of the elastomer in the resin composition serving as a raw material, and it is also important to suppress an increase in the melt viscosity of the resin composition at that time. In view of the above, the present inventors diligently studied the kneading conditions in the production of the resin composition to look into the relationship between the melt viscosity ν at 240° C. and the average distance between elastomer interfaces, τ, of the resin composition and the durability of the tire using the resin composition, and have found that when the relationship of the above expression (1) is satisfied, the durability of the tire using the resin composition is greatly improved.

Here, the melt viscosity ν at 240° C. is an indicator of the fluidity of the resin composition at the time of molding, while the average distance between elastomer interfaces, τ, is an indicator of the dispersibility of the elastomer in a resin composition, and when a resin composition satisfies expression (1), the durability of the tire using the resin composition can be improved.

In the relationship of expression (1), when the melt viscosity ν at 240° C. is low, the fluidity of the resin composition is excellent even if the average distance between elastomer interfaces, τ, is long so that the poor dispersibility of the elastomer is compensated and the durability of the tire can be improved. Conversely, when the average distance between elastomer interfaces, τ, is short, the dispersibility of the elastomer is excellent even if the melt viscosity ν at 240° C. is high so that the poor fluidity of the resin composition is compensated and the durability of the tire can be improved.

In the resin composition used for the tire of the present disclosure, the melt viscosity ν at 240° C. and the average distance between elastomer interfaces, τ, are not particularly limited as long as the relationship of the above expression (1) is satisfied, and the melt viscosity ν at 240° C. is preferably in the range of 250 to 3000 Pa·sec, and the average distance between elastomer interfaces, τ, is preferably in the range of 0.2 to 0.5 μm. When the melt viscosity ν at 240° C. is in the range of 250 to 3000 Pa·sec and the average distance between elastomer interfaces, τ, is in the range of 0.2 to 0.5 μm, the balance between the fluidity of the resin composition and the dispersibility of the elastomer is good, and the durability of the tire can be further improved.

The resin composition used for the tire of the present disclosure contains a polyamide resin. Here, the polyamide resin is not particularly limited and any polyamide resin may be used, and a polyamide resin formed by polymerizing an aliphatic diamine having 6 to 20 carbon atoms and an aliphatic dicarboxylic acid having 10 to 20 carbon atoms is preferable. The polyamide resin formed by polymerizing an aliphatic diamine having 6 to 20 carbon atoms and an aliphatic dicarboxylic acid having 10 to 20 carbon atoms can hardly absorb water and thus the water absorption rate of the tire using the resin composition can be reduced. Consequently, a degradation in physical properties such as rigidity or strength of the tire can be inhibited regardless of use in a high-humidity environment, such as summer, or contact with water during use in the rain, and good durability can be ensured in a wide range of moist environments.

Examples of the aliphatic diamine having 6 to 20 carbon atoms constituting the polyamide resin include 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, 1,18-octadecamethylenediamine, 2,2,4-trimethyl-1,6-hexamethylenediamine, 2,4,4-trimethyl-1,6-hexamethylenediamine, and 2-methyl-1,8-octamethylenediamine.

Examples of the aliphatic dicarboxylic acid having 10 to 20 carbon atoms constituting the polyamide resin include 1,10-decanedioic acid (i.e. sebacic acid), 1,11-undecanedioic acid, 1,12-dodecanedioic acid, 1,14-tetradecanedioic acid, 1,16-hexadecanedioic acid, 1,18-octadecanedioic acid, and 1,20-eicosanedioic acid.

Examples of the above-described resultant formed by polymerizing an aliphatic diamine having 6 to 20 carbon atoms and an aliphatic dicarboxylic acid having 10 to 20 carbon atoms, i.e. a condensation polymer of an aliphatic diamine having 6 to 20 carbon atoms and an aliphatic dicarboxylic acid having 10 to 20 carbon atoms include polyamide 610 (PA 610), polyamide 612 (PA 612), polyamide 1010 (PA 1010), and polyamide 1012 (PA 1012). The polyamide resin can be synthesized by condensation polymerization of an aliphatic diamine having 6 to 20 carbon atoms and an aliphatic dicarboxylic acid having 10 to 20 carbon atoms using a known method. Commercial products may also be used, such as trade names "Hyprolon 70NN", "Hyprolon 70SFN", "Hyprolon 90NN", "Hyprolon 200NN", and "Hyprolon 400NN" manufactured by Arkema Company.

In the above-described resultant formed by polymerizing an aliphatic diamine having 6 to 20 carbon atoms and an aliphatic dicarboxylic acid having 10 to 20 carbon atoms, i.e. the condensation polymer of an aliphatic diamine having 6 to 20 carbon atoms and an aliphatic dicarboxylic acid having 10 to 20 carbon atoms, two amide bonds at a time are reversed in direction in the main chain, as illustrated in formula (2) below.

(2)

On the other hand, the amide bonds in the main chain are in the same direction in a polyamide obtained by ring-opening polymerization of lactam, as illustrated in formula (3) below.

(3)

A polyamide in which two amide bonds of the main chain at a time are reversed in direction is less crystalline and has a higher degree of freedom of the molecular chain, and thus has higher mechanical strength, than a polyamide in which the amide bonds of the main chain are in the same direction. Furthermore, a polyamide in which two amide bonds of the main chain at a time are reversed in direction has a small entropy difference between the melt and the crystal and thus also has a high melting point and excellent heat resistance. Therefore, using a resin composition that includes a condensation polymer of an aliphatic diamine having 6 to 20 carbon atoms and an aliphatic dicarboxylic acid having 10 to 20 carbon atoms in the tire can improve physical properties such as the rigidity and strength of the tire and can further improve durability.

In the resin composition, it is preferable that 60 to 90% by mass of the polyamide resin be polyamide 610 having a melt flow rate (MFR) under a load of 2.16 kg at 240° C. of 50 g/10 min or less and 10 to 40% by mass of the polyamide resin be polyamide 610 having a melt flow rate (MFR) under a load of 2.16 kg at 240° C. of 60 g/10 min or more.

When 60 to 90% by mass of the polyamide resin is polyamide 610 having a melt flow rate (MFR) under a load of 2.16 kg at 240° C. of 50 g/10 min or less, and 10 to 40% by mass of the polyamide resin is polyamide 610 having a melt flow rate (MFR) under a load of 2.16 kg at 240° C. of 60 g/10 min or more, the diffusion of molecules at the weld interface is promoted without impairing the strength and fatigue resistance and the weld strength can be improved, and thus the durability of the tire is further improved.

The content of the polyamide resin in the resin composition is preferably in the range of 60 to 90% by mass, more preferably in the range of 65 to 85% by mass, and even more preferably in the range of 70 to 80% by mass. When the content of the polyamide resin in the resin composition is 60 to 90% by mass, the durability of the tire is further improved.

The resin composition used for the tire of the present disclosure contains an elastomer having a glass transition temperature (Tg) of 25° C. or less, and the elastomer preferably has a glass transition temperature (Tg) of 0° C. or less, and more preferably has a glass transition temperature (Tg) of −20° C. or less. By including an elastomer having a glass transition temperature (Tg) of 25° C. or less in the resin composition, the resin composition can maintain good elasticity, and the durability of the tire can be improved. Further, when the glass transition temperature (Tg) of the elastomer is 0° C. or less, the durability of the tire at a low temperature is further improved.

As the above elastomer, any elastomer may be used, and from the viewpoint of obtaining excellent elasticity and durability, examples of the elastomer include polyethylene, polypropylene, ethylene-propylene rubber, ethylene-1-butene copolymer, poly α-olefin, acrylic rubber, styrene-ethylene-butylene-styrene copolymer, and modified polymers thereof. Among these, the elastomer preferably includes at least one selected from the group consisting of ethylene-propylene rubber, poly α-olefin, acrylic rubber, styrene-ethylene-butylene-styrene copolymer, and ethylene-1-butene copolymer from the viewpoint of obtaining better elasticity and durability.

Although the elastomer may be an unmodified elastomer or a modified elastomer, the elastomer is preferably a modified elastomer in which maleic anhydride or an epoxy-terminated acrylic acid ester is copolymerized or grafted onto at least a part of the elastomer. The modified elastomer with which these compounds are copolymerized, or onto which these compounds are grafted, reacts with the terminal group of a polyamide resin to increase the dispersibility in the resin composition, and thus the elasticity and durability of the tire are further improved.

In the resin composition, it is preferable that 10 to 50% by mass of the elastomer be a modified elastomer and 90 to 50% by mass of the elastomer be an unmodified elastomer.

When 10 to 50% by mass of the elastomer is a modified elastomer and 90 to 50% by mass of the elastomer is an unmodified elastomer, the modified elastomer wraps around the unmodified elastomer and is predominantly present on the polyamide/elastomer interface, thereby achieving both the dispersion and the fluidity, and thus the durability of the tire is further improved.

In the resin composition, it is preferable that a melt flow rate (MFR) under a load of 2.16 kg at 230° C. of the elastomer be 15 g/10 min or more. When the melt flow rate (MFR) under a load of 2.16 kg at 230° C. of the elastomer is 15 g/10 min or more, the melt viscosity v at 240° C. of the resin composition is low and the fluidity of the resin composition is high, and thus the durability of the tire is further improved.

The content of the elastomer in the resin composition is preferably in the range of 10 to 40% by mass, and more preferably in the range of 15 to 35% by mass. When the content of the elastomer in the resin composition is 10 to 40% by mass, the durability of the tire is further improved.

The resin composition used for the tire of the present disclosure preferably further contains a plasticizer. When the resin composition includes a plasticizer, the melt viscosity v at 240° C. of the resin composition is low and the fluidity of the resin composition is high, and thus the durability of the tire is further improved.

Here, the plasticizer is not particularly limited and any plasticizer may be used, and from the viewpoint of reducing the melt viscosity v at 240° C. of the resin composition, N-butylbenzenesulfonamide, 2-ethylhexyl-4-hydroxybenzoate, and N-(2-hydroxypropyl)benzenesulfonamide are preferable. These plasticizers may be used alone or in combination of two or more.

In the resin composition, the content of the plasticizer is preferably in the range of 1 to 20% by mass, and more preferably in the range of 2 to 10% by mass. When the content of the plasticizer is 1 to 20% by mass, the durability of the tire is further improved.

In addition to the polyamide resin, elastomer, and plasticizer described above, the resin composition may include one or more additives such as a heat-resistant agent, an ultraviolet absorbing agent, a light stabilizer, an age resistor, an antistatic agent, a lubricant, a crystal nucleating agent, a tackifier, an anti-fogging agent, a release agent, a filler, a pigment, a dye, a fragrance, and a flame retardant.

The resin composition may be produced by arbitrarily blending the polyamide resin and the elastomer with other components selected as necessary, and appropriately adjusting the kneading conditions.

Here, examples of the kneading conditions for controlling the melt viscosity v at 240° C. and the average distance between elastomer interfaces, to satisfy the relationship of expression (1) include the rotation speed of the screw of the kneader, the flow rate of the polyamide resin, the kneading temperature, the elastomer charging position, the screw configuration, the L/D of the kneader. In an example, the kneading was performed under the conditions of a cylinder temperature of 225 to 240° C., a rotation speed of 300 rpm, and a discharge rate of 150 kg/h using TEX44αIII (screw diameter: 44 mm, L/D 52.5) manufactured by Japan Steel Works, Ltd.

The resin composition may be processed into a tire member having a desired shape, for example, a framework member, using various molding methods. Here, as a molding method, injection molding is preferable.

The tire of the present disclosure is preferably a tire in which the framework member is formed of a resin composition. Here, the framework member of the tire is a member constituting the tire framework. More specifically, the framework member is a member that supports a rubber member from the inside toward the outside of the tire in order to maintain the shape of the tire tread. For example, the framework member refers to an inner cylinder, an outer cylinder, and connecting members (a spoked structure) or the like in a non-pneumatic tire.

Next, a non-pneumatic tire according to an embodiment of the present disclosure will be described.

Figure 1:
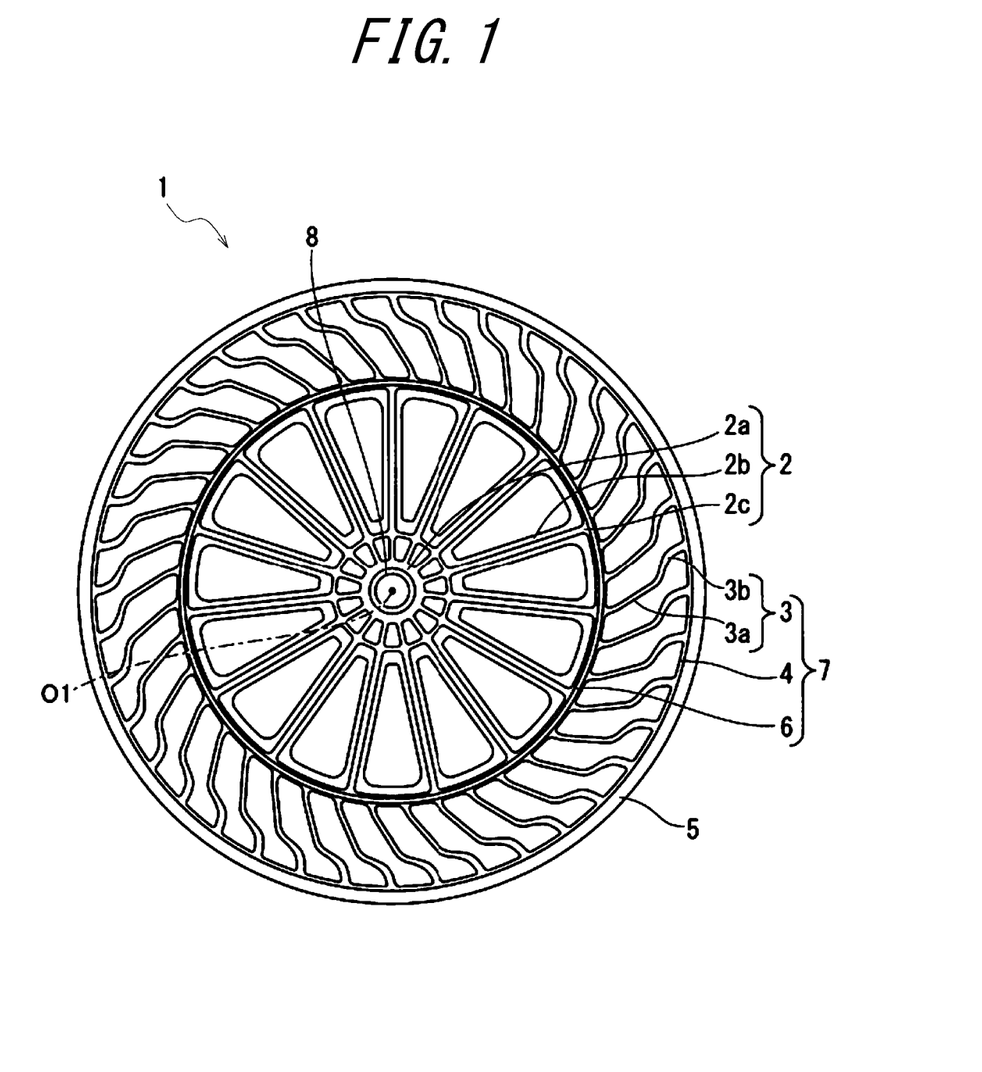
FIG. 1 is a side view schematically illustrating a configuration of a non-pneumatic tire according to an embodiment of the present disclosure.

FIG. 1 is a side view schematically illustrating a configuration of a non-pneumatic tire according to an embodiment of the present disclosure. In each drawing used in the following description, the scale is appropriately changed to make each member have a recognizable size.

As illustrated in FIG. 1, the non-pneumatic tire 1 includes a wheel portion 2 attached to an axle and a tire portion 7 arranged on the outer circumference of the wheel portion 2.

The non-pneumatic tire 1 is used for bicycles, two-wheeled vehicles, automobiles, or the like (hereinafter, these generic names are simply referred to as vehicles).

Here, the wheel portion 2 is formed in a disk shape, the tire portion 7 is formed in an annular shape, and each central axis is located on a common axis. This common axis is referred to as the "central axis O1", and a direction along the central axis O1 is referred to as the "tire width direction". Further, in a side view as viewed from the tire width direction, a rotating direction around the central axis O1 is referred to as the "tire circumferential direction", and a direction orthogonal to the central axis O1 is referred to as the "tire radial direction".

As illustrated in FIG. 1, the wheel portion 2 includes a cylindrical boss 8 extending in the tire width direction around the central axis O1, a holding cylindrical portion 2a fixed to an outer circumferential surface of the boss 8, an externally covering cylindrical portion 2c surrounding the holding cylindrical portion 2a from an outside in the tire radial direction, and a plurality of ribs 2b connecting the holding cylindrical portion 2a and the externally covering cylindrical portion 2c to each other.

In the present embodiment, the boss 8 is formed of aluminum. The boss 8 is rotatably supported by the axle such that the wheel portion 2 is attached to the axle. The boss 8 may be formed of a metal other than aluminum or a nonmetal. In the tire width direction, the width of the boss 8 is larger than the widths of the holding cylindrical portion 2a, the plurality of ribs 2b, and the externally covering cylindrical portion 2c.

The holding cylindrical portion 2a and the externally covering cylindrical portion 2c are each arranged coaxially with the boss 8. For example, the plurality of ribs 2b are arranged at equal intervals in the tire circumferential direction. The plurality of ribs 2b each extend radially around the boss 8.

In the present embodiment, the holding cylindrical portion 2a, the plurality of ribs 2b, and the externally covering cylindrical portion 2c are integrally formed of a thermoplastic resin. Accordingly, the wheel portion 2 can be molded by injection molding, and is suitable for mass production.

Note that the boss 8, the holding cylindrical portion 2a, the plurality of ribs 2b, and the externally covering cylindrical portion 2c may each be formed separately. Additionally, the holding cylindrical portion 2a, the plurality of ribs 2b, and the externally covering cylindrical portion 2c may be formed of a material other than the thermoplastic resin.

The tire portion 7 includes an inner cylinder 6 externally fitted on the externally covering cylindrical portion 2c of the wheel portion 2, an outer cylinder 4 surrounding the inner cylinder 6 from an outside in the tire radial direction, elastically deformable connecting members 3 connecting the inner cylinder 6 and the outer cylinder 4 movably. A tread member 5 is fitted on the outer circumferential surface of the outer cylinder 4.

The inner cylinder 6 is attached to the axle via the wheel portion 2. The central axes of the inner cylinder 6 and the outer cylinder 4 are arranged coaxially with the central axis O1. The inner cylinder 6, the connecting members 3, and the outer cylinder 4 are arranged in a state in which the center portions in the tire width direction coincide with each other in the tire width direction.

In the present embodiment, the inner cylinder 6, the connecting members 3, and the outer cylinder 4 are integrally formed of a thermoplastic resin. Accordingly, the tire portion 7 can be molded by injection molding, and is suitable for mass production.

Note that the inner cylinder 6, the connecting members 3, and the outer cylinder 4 may each be formed separately. Additionally, the inner cylinder 6, the connecting members 3, and the outer cylinder 4 may be formed of a material other than the thermoplastic resin.

The tire portion 7 and the wheel portion 2 may be integrally formed or may be formed separately. The wheel portion 2 has the function of connecting the boss 8 and the tire portion 7, and the tire portion 7 has the function of absorbing vibration transmitted from the ground to the boss 8. The wheel portion 2 and the tire portion 7 having different functions as such may be formed of different materials.

The tread member 5 is formed of vulcanized rubber obtained by vulcanizing a rubber composition containing natural rubber or the like, or a thermoplastic material, for example. Examples of the thermoplastic material include thermoplastic resins such as urethane resin, olefin resin, vinyl chloride resin, and polyamide resin. From the viewpoint of wear resistance, it is preferable to form the tread member 5 from vulcanized rubber.

The connecting members 3 are formed in a rectangular plate shape that is curved as a whole, with the front and rear surfaces facing the tire circumferential direction, and the side surfaces facing the tire width direction. The connecting members 3 are formed of an elastically deformable material, and connect the outer circumferential surface side of the inner cylinder 6 and the inner circumferential surface side of the outer cylinder 4 so as to be relatively elastically displaceable. The plurality of connecting members 3 are arranged at equal intervals in the tire circumferential direction.

The plurality of connecting members 3 each have an inner portion 3a connected to the inner cylinder 6 and an outer portion 3b connected to the outer cylinder 4. The inner portion 3a and the outer portion 3b are connected to each other at the center portion in the tire radial direction of the connecting member 3, and cross at an obtuse angle at the connecting portion in a side view. The thickness of the inner portion 3a in the tire circumferential direction is smaller than the thickness of the outer portion 3b in the tire circumferential direction. The thickness of the outer portion 3b in the tire circumferential direction is gradually increased toward outside in the tire radial direction.

In the non-pneumatic tire according to the present embodiment, the framework member corresponds to the inner cylinder 6, the outer cylinder 4, and the connecting members 3 of the non-pneumatic tire, and the inner cylinder 6, the outer cylinder 4, and the connecting members 3 are formed of the resin composition described above, that is, the resin composition containing the polyamide resin and the elastomer having a glass transition temperature of 25° C. or less, wherein the melt viscosity $v$ at 240° C. and the average distance between elastomer interfaces, $\tau$, satisfy the relationship of expression (1).

By forming the inner cylinder 6, the outer cylinder 4, and the connecting members 3 from the resin composition described above, a non-pneumatic tire having excellent durability can be provided.

Next, a non-pneumatic tire according to another embodiment of the present disclosure will be described.

Figure 2:
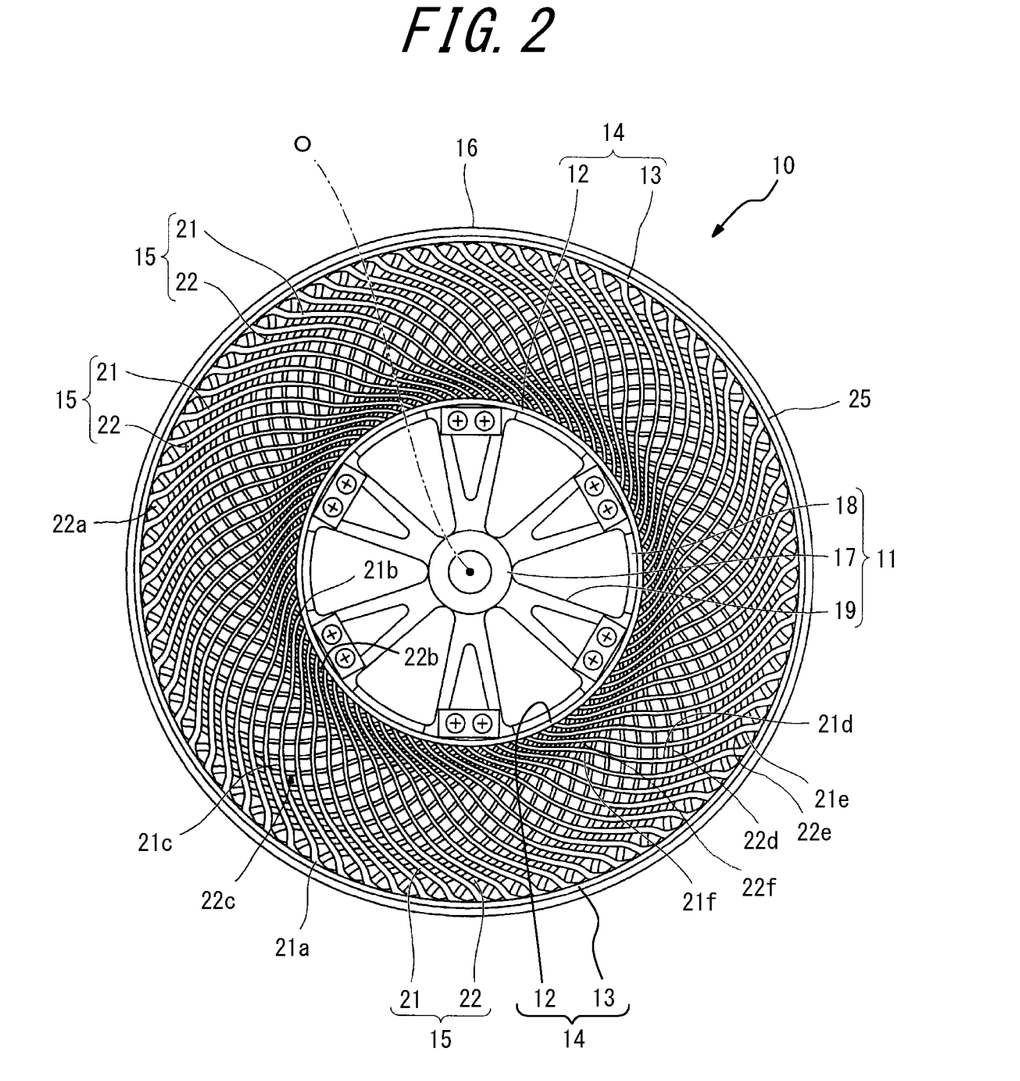
FIG. 2 is a view schematically illustrating a configuration of a non-pneumatic tire according to another embodiment of the present disclosure as viewed from a side surface of the tire.
Figure 3:
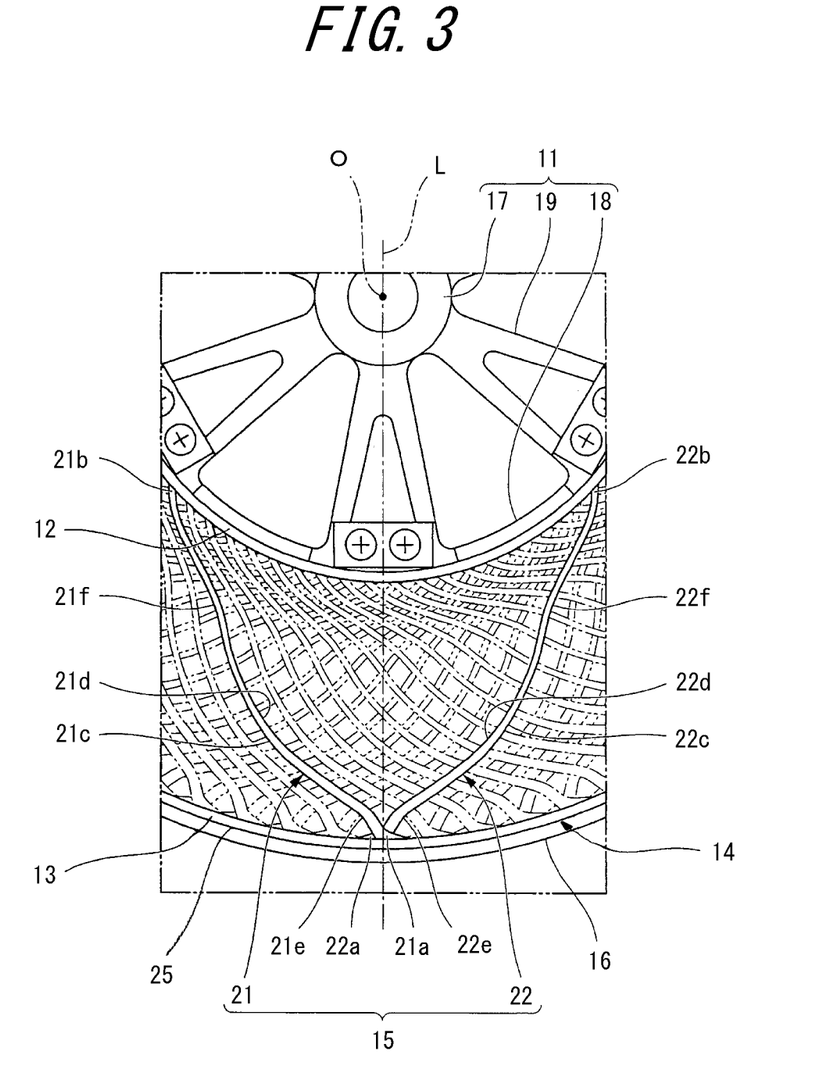
FIG. 3 is a view illustrating a portion of FIG. 2 in an enlarged manner.

FIG. 2 is a view schematically illustrating a configuration of a non-pneumatic tire according to another embodiment of the present disclosure as viewed from a side surface of the tire, and FIG. 3 is a view illustrating a portion of FIG. 2 in an enlarged manner. For the sake of clarity, in FIG. 3, only one first elastic connecting plate 21 and one second elastic connecting plate 22 of the below-described plurality of first elastic connecting plates 21 and plurality of second elastic connecting plates 22 are depicted with solid lines for emphasis.

As illustrated in FIGS. 2 and 3, a non-pneumatic tire 10 in the present embodiment includes a wheel portion 11 to be attached to an axle (not illustrated), a ring member 14 including an inner cylinder 12 externally covering the wheel portion 11 and an outer cylinder 13 surrounding the inner cylinder 12 from an outside in the tire radial direction, a plurality of connecting members 15 arranged along the tire circumferential direction between the inner cylinder 12 and the outer cylinder 13 and connecting the cylinders 12 and 13 to each other, and a tread member 16 formed of vulcanized rubber and integrally covering the outer circumference of the ring member 14.

The wheel portion 11, the inner cylinder 12, the outer cylinder 13, and the tread member 16 are arranged coaxially with a common axis and with their center portions in the tire width direction coinciding with each other. The common axis is referred to as the "axis line O", the direction orthogonal to the axis line O as the "tire radial direction", and the rotating direction around the axis line O as the "tire circumferential direction".

The wheel portion 11 includes a holding cylindrical portion 17 in which an end of the axle is held, an outer ring portion 18 surrounding the holding cylindrical portion 17 from an outside in the tire radial direction, and a plurality of ribs 19 connecting the holding cylindrical portion 17 and the outer ring portion 18 (see FIGS. 2 and 3).

The holding cylindrical portion 17, the outer ring portion 18, and the ribs 19 are integrally formed of a metal material such as an aluminum alloy. The holding cylindrical portion 17 and the outer ring portion 18 are each formed to be cylindrical and are arranged coaxially with the axis line O. The plurality of ribs 19 are arranged at equal intervals in the circumferential direction.

Each connecting member 15 includes a first elastic connecting plate 21 and a second elastic connecting plate 22 connecting the inner cylinder 12 and the outer cylinder 13 in the ring member 14 to each other. A plurality of first elastic connecting plates 21 are arranged along the tire circumferential direction at one position in the tire width direction, and a plurality of second elastic connecting plates 22 are arranged along the tire circumferential direction at an other position in the tire width direction different from the one position in the tire width direction. For example, a total of 60 first elastic connecting plates 21 and second elastic connecting plates 22 are provided.

In other words, the plurality of first elastic connecting plates 21 are arranged along the tire circumferential direction at the same position in the tire width direction, and the plurality of second elastic connecting plates 22 are arranged along the tire circumferential direction at the same position in the tire width direction away from the first elastic connecting plates 21 in the tire width direction.

The plurality of connecting members 15 are individually arranged at positions that are axisymmetric with respect to the axis line O, between the inner cylinder 12 and outer cylinder 13 in the ring member 14. All connecting members 15 have the same shape and the same size. The width of each connecting member 15 in the tire width direction is less than the width of the outer cylinder 13 in the tire width direction.

First elastic connecting plates 21 adjacent in the tire circumferential direction are not in contact with each other, and second elastic connecting plates 22 adjacent in the tire circumferential direction are not in contact with each other. Furthermore, a first elastic connecting plate 21 and a second elastic connecting plate 22 adjacent in the tire width direction are not in contact with each other.

The first elastic connecting plates 21 and the second elastic connecting plates 22 have the same width in the tire width direction. The first elastic connecting plates 21 and the second elastic connecting plates 22 also have the same thickness in a tire side view.

One end portions 21a of the first elastic connecting plates 21 connected to the outer cylinder 13 are located closer to one side in the tire circumferential direction than the other end portions 21b of the first elastic connecting plates 21 connected to the inner cylinder 12, and one end portions 22a of the second elastic connecting plates 22 connected to the outer cylinder 13 are located closer to the other side in the tire circumferential direction than the other end portions 22b of the second elastic connecting plates 22 connected to the inner cylinder 12.

The respective one end portions 21a and 22a of the first elastic connecting plates 21 and the second elastic connecting plates 22 are disposed at different positions in the tire width direction and connected at the same positions in the tire circumferential direction on the inner circumferential surface of the outer cylinder 13.

In the illustrated example, in the first elastic connecting plates 21 and the second elastic connecting plates 22, a plurality of curved portions 21d to 21f and 22d to 22f, respectively, curved in the tire circumferential direction are formed in intermediate portions 21c and 22c, respectively, located between the one end portions 21a and 22a, respectively, and the other end portions 21b and 22b, respectively, along extending directions of the elastic connecting plates 21 and 22, respectively, in a tire side view as the tire 10 is viewed from the tire width direction. In both the elastic connecting plates 21 and 22, of the plurality of curved portions 21d to 21f and 22d to 22f, respectively, curve directions of the curved portions 21d to 21f and 22d to 22f, respectively, adjacent to each other in the above-mentioned extending direction are opposite to each other.

The plurality of curved portions 21d to 21f formed in the first elastic connecting plates 21 have first curved portions 21d curved to protrude toward the other side in the tire circumferential direction, second curved portions 21e located between the first curved portions 21d and the one end portions 21a and curved to protrude toward the one side in the tire circumferential direction, and third curved portions 21f located between the first curved portions 21d and the other end portions 21b and curved to protrude toward the one side in the tire circumferential direction.

The plurality of curved portions 22d to 22f formed in the second elastic connecting plates 22 have first curved portions 22d curved to protrude toward the one side in the tire circumferential direction, second curved portions 22e located between the first curved portions 22d and the one end portions 22a and curved to protrude toward the other side in the tire circumferential direction, and third curved portions 22f located between the first curved portions 22d and the other end portions 22b and curved to protrude toward the other side in the tire circumferential direction.

In the illustrated example, the first curved portions 21d and 22d are greater in radius of curvature in a tire side view than the second curved portions 21e and 22e and the third curved portions 21f and 22f. The first curved portions 21d and 22d are arranged at a center portion in the extending directions of the first elastic connecting plate 21 and the second elastic connecting plate 22, respectively.

Further, the lengths of both the elastic connecting plates 21 and 22 are equal to each other. As illustrated in FIG. 3, the respective other end portions 21b and 22b of both the elastic connecting plates 21 and 22 are individually connected at positions separated by the same angle (e.g., 20° or more and 135° or less) from positions on the outer circumferential surface of the inner cylinder 12 opposite to the one end portions 21a and 22a, respectively, in the tire radial direction at one side and the other side in the tire circumferential direction around the axis line O in a tire side view. In addition, the first curved portions 21d and 22d, the second curved portions 21e and 22e, and the third curved portions 21f and 22f of the first elastic connecting plates 21 and the second elastic connecting plates 22 protrude to oppose each other in the tire circumferential direction and have the same size.

Accordingly, the shapes of the connecting members 15 in a tire side view is linearly symmetrical with respect to a virtual line L that extends along the tire radial direction and passes through the respective one end portions 21a and 22a of both the elastic connecting plates 21 and 22, as can be seen from a pair of the first elastic connecting plate 21 and the second elastic connecting plate 22 depicted with solid lines for emphasis in FIG. 3.

In addition, in both the elastic connecting plates 21 and 22, one end side portions extending from the center portion to the one end portions 21a and 22a, respectively, in the above-mentioned extending direction are thicker than the other end side portions extending from the center portion to the other end portions 21b and 22b, respectively, in a tire side view, as illustrated in FIG. 3. This can enhance the strength of the one end side portions that tend to be under a heavy load in the first elastic connecting plates 21 and the second elastic connecting plates 22 while preventing an increase in weight of the connecting members 15 and ensuring the flexibility of the connecting members 15. Note that the one end side portions smoothly continue to the other end side portions without any step difference.

The ring member 14 may be divided into a one-side split ring member located on one side in the tire width direction and an other-side split ring member located on the other side in the tire width direction, for example at a center portion in the tire width direction. In this case, the one-side split ring member may be formed integrally with the first elastic connecting plates 21, and the other-side split ring member may be formed integrally with the second elastic connecting plates 22. Further, the one-side split ring member and the first elastic connecting plates 21 may be formed integrally by injection molding, and the other-side split ring member and the second elastic connecting plates 22 may be formed integrally by injection molding.

The ring member 14 is fixed to a wheel portion 11 in a state where the inner cylinder 12 is fitted onto the wheel portion 11.

In the non-pneumatic tire according to an embodiment of the present disclosure, the framework member corresponds to the ring member 14 and the connecting members 15 of the non-pneumatic tire, and the inner cylinder 12 and the outer cylinder 13 of the ring member 14 and the connecting members 15 are formed of the resin composition described above, that is, the resin composition containing the polyamide resin and the elastomer having a glass transition temperature of 25° C. or less, wherein the melt viscosity ν at 240° C. and the average distance between elastomer interfaces, τ, satisfy the relationship of expression (1).

By forming the inner cylinder 12, the outer cylinder 13, and the connecting members 15 from the resin composition described above, a non-pneumatic tire having excellent durability can be provided.

In the non-pneumatic tire according to an embodiment of the present disclosure, although the inner cylinder 12, the outer cylinder 13, and the connecting members 15 need to be formed of the resin composition described above, different resin compositions may be used for the inner cylinder 12, the outer cylinder 13, and the connecting members 15 that constitute the framework member.

In the non-pneumatic tire 10 of the present embodiment, the tread member 16 is formed to be cylindrical and integrally covers the entire outer circumferential surface side of the outer cylinder 13 of the ring member 14. The tread member 16 is formed of vulcanized rubber obtained by vulcanizing a rubber composition containing, for example, natural rubber from the viewpoint of wear resistance and the like.

An adhesion layer 25 is located between the outer cylinder 13 of the ring member 14 and the tread member 16 to mediate the bonding between the outer cylinder 13 and the tread member 16. A commercially available adhesive may be used for the adhesion layer. Examples thereof include, but are not limited to, cyanoacrylate-based adhesives and epoxy-based adhesives.

The following describes another example of the connecting members that connect the inner cylinder 12 and the outer cylinder 13.

Figure 4A:
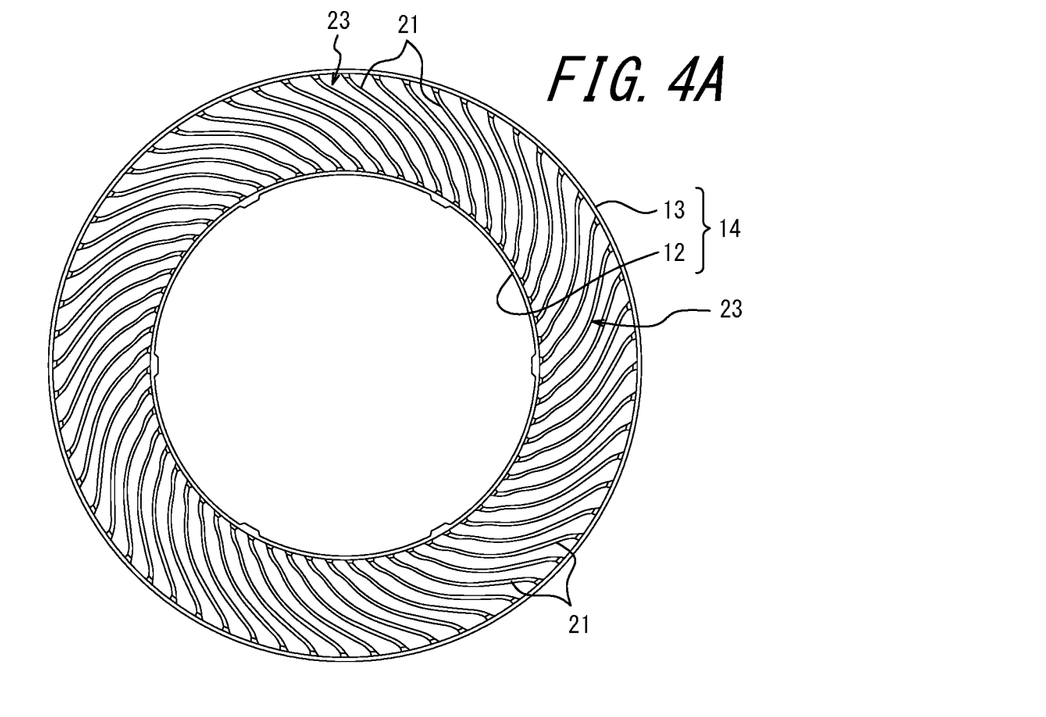
FIGS. 4A and 4B are each a front view and a perspective view illustrating the inner cylinder and outer cylinder connected by connecting members in another example.
Figure 4B:
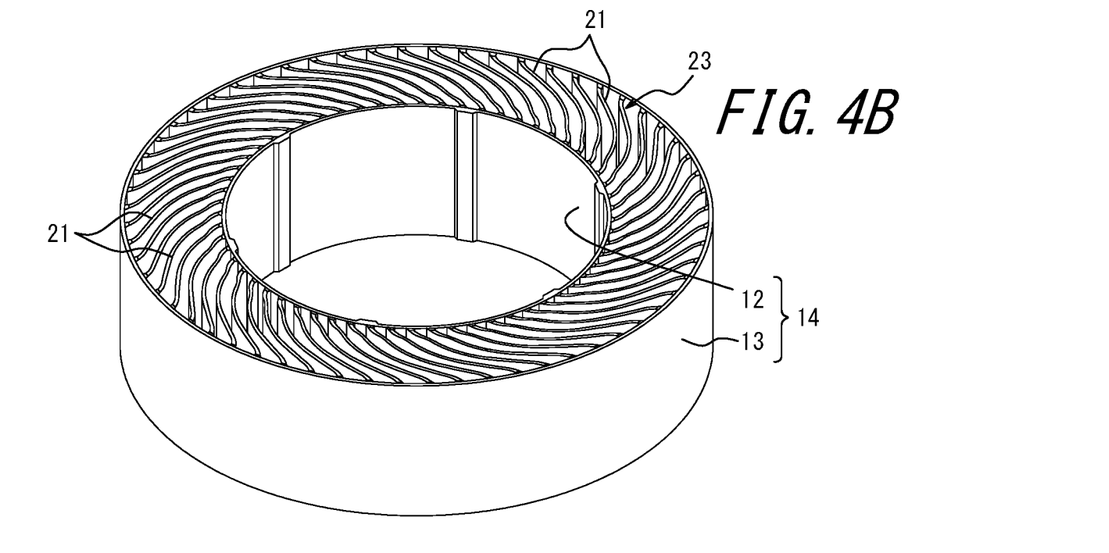

FIGS. 4A and 4B are a front view and a perspective view, respectively, of the inner cylinder and outer cylinder connected by connecting members in another example. As illustrated in FIGS. 4A and 4B, each connecting member 23 is constituted of only the first elastic connecting plate 21, unlike the connecting member 15 constituted of the first elastic connecting plate 21 and the second elastic connecting plate 22. A plurality of first elastic connecting plates 21 constituting a connecting member 23 are arranged along the tire circumferential direction between the inner cylinder 12 and the outer cylinder 13, and connect both the cylinders 12 and 13 to each other. The other configurations and functions are the same as those of the connecting members 15.

EXAMPLES

The present disclosure will be described below in detail with reference to Examples. However, the present disclosure is no way limited to the following Examples.

(Resin Component of Resin Composition)

Resin 1 below was used as the resin component of the resin composition used for the tires in Examples and Comparative Examples.

Resin 1: polyamide 610 (PA 610), manufactured by Arkema Company, trade name "Hyprolon 70NN", Young's modulus at 23° C. of 2000 MPa, melt flow rate (MFR) under a load of 2.16 kg at 240° C. of 45 g/10 min (Elastomer Component of Resin Composition)

Elastomers A to D below were used as the elastomer component of the resin composition used for the tires in Examples and Comparative Examples.

Elastomer A: poly α-olefin, manufactured by Sumitomo Chemical Co., Ltd., trade name "TAFMER MP610", glass transition temperature (Tg) of −30° C., modified group=graft of maleic anhydride (MAH-g), modification ratio of 1, melt flow rate (MFR) under a load of 2.16 kg at 230° C. of 0.7 g/10 min Elastomer B: poly α-olefin, manufactured by Sumitomo Chemical Co., Ltd., trade name "TAFMER MH7020", glass transition temperature (Tg) of −50° C., modified group=graft of maleic anhydride (MAH-g), modification ratio of 2, melt flow rate (MFR) under a load of 2.16 kg at 230° C. of 1.5 g/10 min Elastomer C: poly α-olefin, manufactured by Sumitomo Chemical Co., Ltd., trade name "TAFMER MH7510", glass transition temperature (Tg) of −30° C., modified group=graft of maleic anhydride (MAH-g), modification ratio of 1, melt flow rate (MFR) under a load of 2.16 kg at 230° C. of 70 g/10 min Elastomer D: poly α-olefin, manufactured by Sumitomo Chemical Co., Ltd., trade name "TAFMER DF710", glass transition temperature (Tg) of −30° C. or less, no modified group, modification ratio of 0, melt flow rate (MFR) under a load of 2.16 kg at 230° C. of 2.2 g/10 min The modification ratios of the elastomers A to D were measured by the following method.

<Measurement Method of Elastomer Modification Ratio>

According to JIS K 2501, the modification ratio of the elastomer was measured by potentiometric titration.

(Plasticizer Component of Resin Composition)

N-butylbenzenesulfonamide (trade name "BM-4" manufactured by Daihachi Chemical Industry Co., Ltd.) was used as the plasticizer component of the resin composition used for the tires of Example 5.

Examples 1 to 5 and Comparative Examples 1 to 6

Using TEX44αIII manufactured by Nippon Steel Co., Ltd., polyamide and elastomer were dry blended in advance at a predetermined ratio in accordance with the formulation provided in Table 1 and charged into a hopper. As the plasticizer, a liquid injection pump was used, and the resin composition was prepared by adjusting the flow rate of the polyamide resin and the rotation speed of the screw.

Using the obtained resin compositions, the inner cylinder 6, the outer cylinder 4, and the connecting members 3 of the non-pneumatic tire illustrated in FIG. 1 were molded by injection molding, and using the inner cylinder 6, the outer cylinder 4, and the connecting members 3, non-pneumatic tires were produced as samples. The sample non-pneumatic tires each had a tire size of bicycle tire with an outer diameter of 20 inches (wheel size t 340 mm, width 40 mm) and the structure illustrated in FIG. 1.

Figure 5:
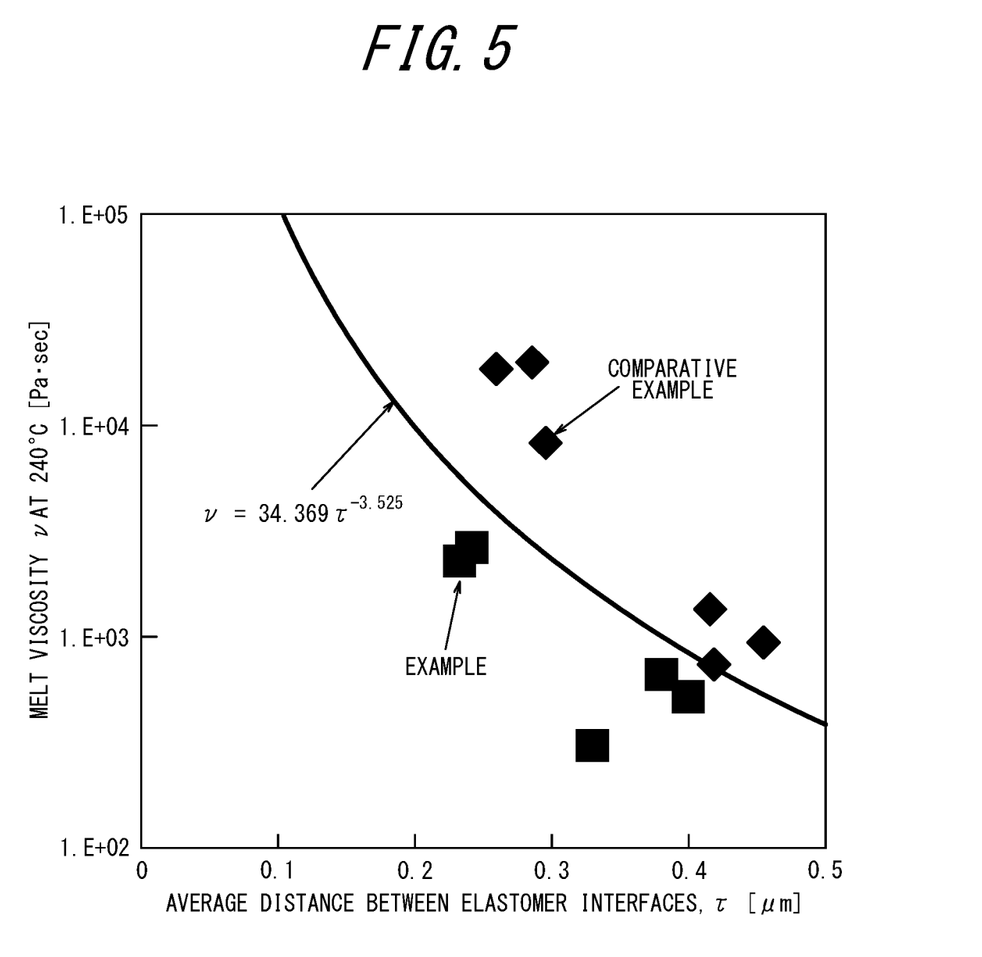
FIG. 5 is a graph illustrating a relationship between the melt viscosity ν (Pa·sec) at 240° C. and the average distance between elastomer interfaces, τ (μm), of resin compositions used for tires of Examples and Comparative Examples.

The sample non-pneumatic tires differed only in the resin composition constituting the inner cylinder 6, the outer cylinder 4, and the connecting members 3. The same was used for the other members. FIG. 5 illustrates a relationship between the melt viscosity ν (Pa·sec) at 240° C. and the average distance between elastomer interfaces, τ (μm), of the resin compositions used for tires of Examples and Comparative Examples.

The following evaluation was performed with respect to the non-pneumatic tire of each produced sample.

<Tire Durability (Durability Against Running Over Projections)>

Hemispheric projections 20 mm in diameter were attached to a drum endurance testing machine, a load of 650 N was applied to each sample in a 40° C. environment, and the running distance until failure when running at 50 km/h was measured to evaluate the tire durability. The resulting running distance of each sample tire is represented as an index value, with the running distance as 100 for the tire in Comparative Example 1. A larger index value represents higher durability of the tire.

TABLE 1

| | | | Comparative Example 1 | Comparative Example 2 | Comparative Example 3 | Comparative Example 4 | Comparative Example 5 | Comparative Example 6 |
|---|---|---|---|---|---|---|---|---|
| Formulation | Resin 1 | % by mass | 70 | 70 | 70 | 70 | 70 | 70 |
| | Elastomer A | | 30 | 30 | 30 | 30 | — | — |
| | Elastomer B | | — | — | — | — | 30 | 30 |
| | Elastomer C | | — | — | — | — | — | — |
| | Elastomer D | | — | — | — | — | — | — |
| | Plasticizer | | — | — | — | — | — | — |
| Kneading conditions | Rotation speed | rpm | 50 | 100 | 250 | 250 | 250 | 250 |
| | Resin flow rate | kg/h | 10 | 10 | 10 | 5 | 10 | 5 |
| Physical properties | Melt viscosity ν at 240° C. | Pa · sec | 743 | 936 | 1351 | 8265 | 19588 | 18111 |
| | Average distance between elastomer interfaces, τ | μm | 0.42 | 0.45 | 0.42 | 0.30 | 0.29 | 0.26 |
| | $34.369\tau^{-3.525}$ | | — | 743 | 567 | 753 | 2272 | 2515 | 3441 |
| Evaluation | Durability | Index | 100 | 73 | 65 | 36 | 31 | 28 |

| | | | Example 1 | Example 2 | Example 3 | Example 4 | Example 5 |
|---|---|---|---|---|---|---|---|
| Formulation | Resin 1 | % by mass | 70 | 70 | 70 | 70 | 72 |
| | Elastomer A | | 15 | 9 | — | — | 20 |
| | Elastomer B | | — | — | — | — | — |
| | Elastomer C | | — | — | 30 | 30 | — |
| | Elastomer D | | 15 | 21 | — | — | — |
| | Plasticizer | | — | — | — | — | 8 |
| Kneading conditions | Rotation speed | rpm | 100 | 100 | 50 | 100 | 100 |
| | Resin flow rate | kg/h | 10 | 10 | 10 | 10 | 10 |
| Physical properties | Melt viscosity ν at 240° C. | Pa · sec | 670 | 524 | 2246 | 2606 | 305 |
| | Average distance between elastomer interfaces, τ | μm | 0.38 | 0.40 | 0.23 | 0.24 | 0.33 |
| | $34.369\tau^{-3.525}$ | | 1011 | 857 | 4879 | 4304 | 1593 |
| Evaluation | Durability | Index | 115 | 128 | 118 | 113 | 983 |

Table 1 indicates that the tires of Examples using the resin composition satisfying the relationship of expression (1) according to the present disclosure as the framework member have greatly improved durability.

REFERENCE SIGNS LIST

1 Non-pneumatic tire
2 Wheel portion
2a Holding cylindrical portion
2b Rib
2c Externally covering cylindrical portion
3 Connecting member
3a Inner portion
3b Outer portion
4 Outer cylinder
5 Tread member
6 Inner cylinder
7 Tire portion
8 Boss
10 Non-pneumatic tire
11 Wheel portion
12 Inner cylinder
13 Outer cylinder
14 Ring member
15 Connecting member
16 Tread member
17 Holding cylindrical portion
18 Outer ring portion
19 Rib
21 First elastic connecting plate (connecting member)
21a One end portion
21b The other end portion
21c Intermediate portion
21d to 21f Curved portion
22 Second elastic connecting plate (connecting member)
22a One end portion 22b The other end portion
22c Intermediate portion
22d to 22f Curved portion
23 Connecting member
25 Adhesion layer

The invention claimed is:

1. A tire obtained by using a resin composition, the resin composition comprising:
a polyamide resin; and
an elastomer having a glass transition temperature of 25° C. or less,
wherein a melt viscosity ν (Pa·sec) at 240° C. of the resin composition and an average distance between elastomer interfaces, τ (μm), satisfy the relationship of the following expression (1):

$$\nu < 34.369\tau^{-3.525} \quad (1),$$

60 to 90% by mass of the polyamide resin is polyamide 610 having a melt flow rate (MFR) under a load of 2.16 kg at 240° C. of 50 g/10 min or less, and
10 to 40% by mass of the polyamide resin is polyamide 610 having a melt flow rate (MFR) under a load of 2.16 kg at 240° C. of 60 g/10 min or more.

2. The tire according to claim 1,
wherein the polyamide resin is a polyamide resin formed by polymerizing an aliphatic diamine having 6 to 20 carbon atoms and an aliphatic dicarboxylic acid having 10 to 20 carbon atoms.

3. The tire according to claim 1,
wherein the elastomer includes at least one selected from the group consisting of polyethylene, polypropylene, ethylene-propylene rubber, ethylene-1-butene copolymer, poly α-olefin, acrylic rubber, and styrene-ethylene-butylene-styrene copolymer.

4. The tire according to claim 1,
wherein maleic anhydride is copolymerized with or grafted onto at least a portion of the elastomer.

5. The tire according to claim 1,
wherein an epoxy-terminated acrylic acid ester is copolymerized with or grafted onto at least a portion of the elastomer.

6. The tire according to claim 1,
wherein the resin composition includes 60 to 90% by mass of the polyamide resin.

7. The tire according to claim 1,
wherein 10 to 50% by mass of the elastomer is a modified elastomer and 90 to 50% by mass of the elastomer is an unmodified elastomer.

8. The tire according to claim 1,
wherein the resin composition further comprises 1 to 20% by mass of a plasticizer.

9. The tire according to claim 8,
wherein the plasticizer includes at least one selected from the group consisting of N-butylbenzenesulfonamide, 2-ethylhexyl-4-hydroxybenzoate, and N-(2-hydroxypropyl)benzenesulfonamide.

10. The tire according to claim 1,
wherein the elastomer has a melt flow rate (MFR) under a load of 2.16 kg at 230° C. of 15 g/10 min or more.

11. The tire according to claim 1, which is a non-pneumatic tire comprising:
a wheel portion to be attached to an axle;
an inner cylinder externally covering the wheel portion;
an outer cylinder surrounding the inner cylinder from an outside in a tire radial direction;
a plurality of connecting members arranged along a tire circumferential direction between the inner cylinder and the outer cylinder and connecting the inner cylinder and the outer cylinder to each other; and
a tread member provided outside the outer cylinder in the tire radial direction,
wherein the inner cylinder, the outer cylinder, and the connecting members are formed of the resin composition.

12. The tire according to claim 2,
wherein the elastomer includes at least one selected from the group consisting of polyethylene, polypropylene, ethylene-propylene rubber, ethylene-1-butene copolymer, poly α-olefin, acrylic rubber, and styrene-ethylene-butylene-styrene copolymer.

13. The tire according to claim 2,
wherein maleic anhydride is copolymerized with or grafted onto at least a portion of the elastomer.

14. The tire according to claim 2,
wherein an epoxy-terminated acrylic acid ester is copolymerized with or grafted onto at least a portion of the elastomer.

15. The tire according to claim 2,
wherein the resin composition includes 60 to 90% by mass of the polyamide resin.

16. The tire according to claim 2,
wherein 10 to 50% by mass of the elastomer is a modified elastomer and 90 to 50% by mass of the elastomer is an unmodified elastomer.

17. The tire according to claim 2,
wherein the resin composition further comprises 1 to 20% by mass of a plasticizer.

18. The tire according to claim 2,
wherein the elastomer has a melt flow rate (MFR) under a load of 2.16 kg at 230° C. of 15 g/10 min or more.

* * * * *